United States Patent
Mirzahekmati et al.

(10) Patent No.: US 11,828,187 B2
(45) Date of Patent: Nov. 28, 2023

(54) METHODS AND SYSTEMS FOR DETERMINING A SYNTHESIZED ENGINE PARAMETER

(71) Applicant: PRATT & WHITNEY CANADA CORP., Longueuil (CA)

(72) Inventors: Daryoush Mirzahekmati, Kirkland (CA); Ioan Sabau, LaSalle (CA); Poi Loon Tang, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 461 days.

(21) Appl. No.: 17/078,653

(22) Filed: Oct. 23, 2020

(65) Prior Publication Data

US 2022/0127971 A1 Apr. 28, 2022

(51) Int. Cl.
| | | |
|---|---|---|
| *F01D 21/12* | (2006.01) | |
| *F01D 21/00* | (2006.01) | |
| *F01D 21/14* | (2006.01) | |

(52) U.S. Cl.
CPC .......... *F01D 21/12* (2013.01); *F01D 21/003* (2013.01); *F01D 21/14* (2013.01); *F05D 2220/323* (2013.01); *F05D 2260/81* (2013.01); *F05D 2270/304* (2013.01);
(Continued)

(58) Field of Classification Search
None
See application file for complete search history.

(56) References Cited

U.S. PATENT DOCUMENTS

| | | | |
|---|---|---|---|
| 4,594,849 A | 6/1986 | Kenison et al. | |
| 8,386,121 B1 * | 2/2013 | Simon ................... | G01M 15/02 |
| | | | 701/30.7 |

(Continued)

FOREIGN PATENT DOCUMENTS

| | | |
|---|---|---|
| EP | 2149824 | 2/2010 |
| EP | 3690559 | 8/2020 |
| WO | 2014143707 | 9/2014 |

OTHER PUBLICATIONS

Viana "Metamodeling in Multidisciplinary Design Optimization: How Far Have We Really Come?" (Year: 2014).*
(Continued)

*Primary Examiner* — Arun Goyal
*Assistant Examiner* — William L Breazeal
(74) *Attorney, Agent, or Firm* — NORTON ROSE FULBRIGHT CANADA LLP

(57) ABSTRACT

The present disclosure provides methods and systems for determining a synthesized engine parameter of a gas turbine engine. An initial model parameter is obtained from an onboard model associated with the gas turbine engine. A correction factor for the onboard model is determined by modifying a difference between the onboard model and an aero-thermal model of the gas turbine engine using first and second engine parameters and first and second operating conditions, wherein the first and second engine parameters are independent from one another over an operating envelope of the gas turbine engine. The initial model parameter is scaled by applying the correction factor thereto to obtain a corrected model parameter. The corrected model parameter is output as the synthesized engine parameter.

18 Claims, 7 Drawing Sheets

(52) U.S. Cl.
CPC .......... *F05D 2270/3011* (2013.01); *F05D 2270/313* (2013.01); *F05D 2270/708* (2013.01); *F05D 2270/71* (2013.01)

(56) References Cited

U.S. PATENT DOCUMENTS

2010/0326089 A1\* 12/2010 Weber .................. F02C 6/08
                                                                   60/785
2018/0112603 A1\* 4/2018 Morgan ................ F02C 3/04

OTHER PUBLICATIONS

Uzol "A New High-Fidelity Transient Aerothermal Model for Real-Time Simulations of The T700 Helicopter Turboshaft Engine" (Year: 2011).\*

\* cited by examiner

METHODS AND SYSTEMS FOR DETERMINING A SYNTHESIZED ENGINE PARAMETER

TECHNICAL FIELD

The present disclosure relates to gas turbine engines.

BACKGROUND

In a gas turbine engine, continuous inlet air is compressed, mixed with fuel in an inflammable proportion, and exposed to an ignition source to ignite the mixture which then continues to burn to produce combustion products. The combustion of the air-fuel mixture can be used to power various mechanical components, which in turn can be used to produce thrust.

Monitoring of various parameters within the engine during operation thereof can be of interest in assisting a control system or an operator responsible for the engine. Certain parameters may be difficult to measure using sensors, and are instead synthesized using a model of the engine. Although existing approaches for synthesizing engine parameters are suitable for their purposes, improvements remain desirable.

As such, there is room for improvement.

SUMMARY

In accordance with a broad aspect, there is provided a method for determining a synthesized engine parameter of a gas turbine engine. An initial model parameter is obtained from an onboard model associated with the gas turbine engine. A correction factor for the onboard model is determined by modifying a difference between the onboard model and an aero-thermal model of the gas turbine engine using first and second engine parameters and first and second operating conditions, wherein the first and second engine parameters are independent from one another over an operating envelope of the gas turbine engine. The initial model parameter is scaled by applying the correction factor thereto to obtain a corrected model parameter. The corrected model parameter is output as the synthesized engine parameter.

In accordance with another broad aspect, there is provided a system for determining a synthesized engine parameter of a gas turbine engine. The system comprises a processing unit, and a non-transitory computer-readable medium. The computer-readable medium has computer-readable instructions stored thereon which are executable by the processing unit for: obtaining an initial model parameter from an onboard model associated with the gas turbine engine; determining a correction factor for the onboard model by modifying a difference between the onboard model and an aero-thermal model of the gas turbine engine using first and second engine parameters and first and second operating conditions, wherein the first and second engine parameters are independent from one another over an operating envelope of the gas turbine engine; scaling the initial model parameter by applying the correction factor thereto to obtain a corrected model parameter; and outputting the corrected model parameter as the synthesized engine parameter.

Features of the systems, devices, and methods described herein may be used in various combinations, in accordance with the embodiments described herein. In particular, any of the above features may be used alone, together in any suitable combination, and/or in a variety of arrangements, as appropriate.

BRIEF DESCRIPTION OF THE DRAWINGS

Reference is now made to the accompanying figures in which.

It will be noted that throughout the appended drawings, like features are identified by like reference numerals.

DETAILED DESCRIPTION

Figure 1:
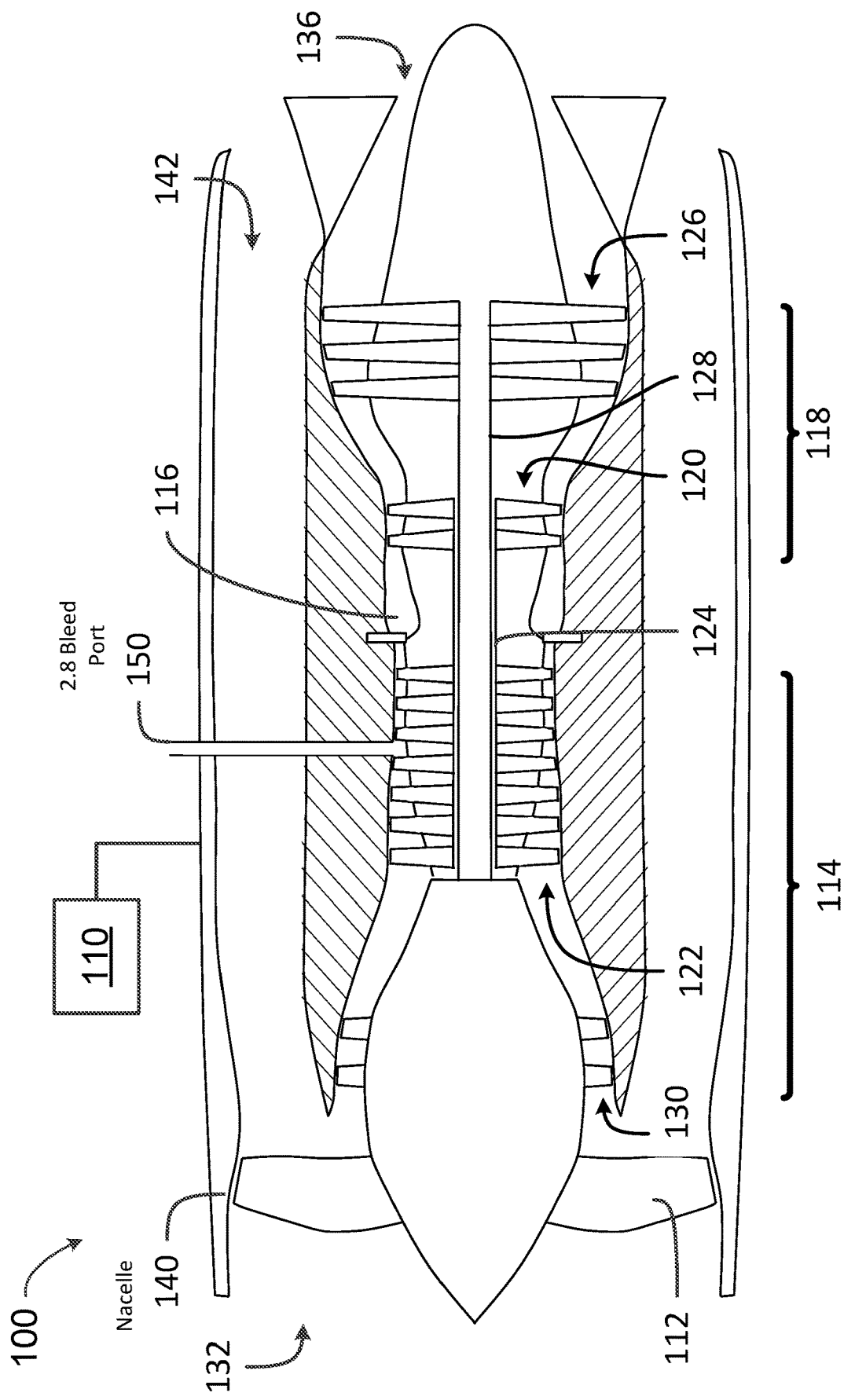
FIG. 1 is a schematic cross-sectional view of an example gas turbine engine.

FIG. 1 illustrates a gas turbine engine 100 of a type provided for use in subsonic flight, generally comprising in serial flow communication, a fan 112 through which ambient air is propelled toward an inlet 132, a compressor section 114 for pressurizing the air, a combustor 116 in which the compressed air is mixed with fuel and ignited for generating an annular stream of hot combustion gases, and a turbine section 118 for extracting energy from the combustion gases, which exit via an exhaust 136. High-pressure rotor(s) of the turbine section 118 (referred to as "HP turbine rotor(s) 120") are drivingly engaged to high-pressure rotor(s) of the compressor section 114 (referred to as "HP compressor rotor(s) 122") through a high-pressure shaft 124. Low-pressure rotor(s) of the turbine section 118 (referred to as "LP turbine rotor(s) 126") are drivingly engaged to the fan rotor 112 and to low-pressure rotor(s) of the compressor section 114 (referred to as "LP compressor rotor(s) 130") through a low-pressure shaft 128 extending within the high-pressure shaft 124 and rotating independently therefrom. The gas turbine engine 100 can be provided with a nacelle 140 which defines a bypass duct 142. Additionally, the gas turbine engine 100 includes a bleed port 150. The bleed port 150 serves to extract air from the gas path of the engine 100, which can be used as part of operations of the broader system of which the engine 100 is part, for instance an aircraft.

Although illustrated as a turbofan engine, the gas turbine engine 100 may alternatively be another type of engine, for example a turboshaft engine, also generally comprising in serial flow communication a compressor section, a combustor, and a turbine section, and an output shaft through which power is transferred. A turboprop engine may also apply. Moreover, although the gas turbine engine 100 is illustrated as a dual-spool engine, it should be understood that the techniques described herein may also apply to single-spool engines. In addition, although the engine 100 is described herein for flight applications, it should be understood that other uses, such as industrial or the like, may apply.

Control of the operation of the engine 100 can be effected by one or more control systems, for example an engine controller 110, which is communicatively coupled to the engine 100. The engine controller 110 can modulate a fuel flow provided to the engine 100, the position and orientation of variable geometry mechanisms within the engine 100, a bleed level of the engine 100, and the like, based on predetermined schedules or algorithms. In some embodiments, the engine controller 110 includes one or more FADEC(s), electronic engine controller(s) (EEC(s)), or the like, that are programmed to control the operation of the engine 100. The operation of the engine 100 can be controlled by way of one or more actuators, mechanical linkages, hydraulic systems, and the like. The engine controller 110 can be coupled to the actuators, mechanical linkages, hydraulic systems, and the like, in any suitable fashion for effecting control of the engine 100.

Figure 2:
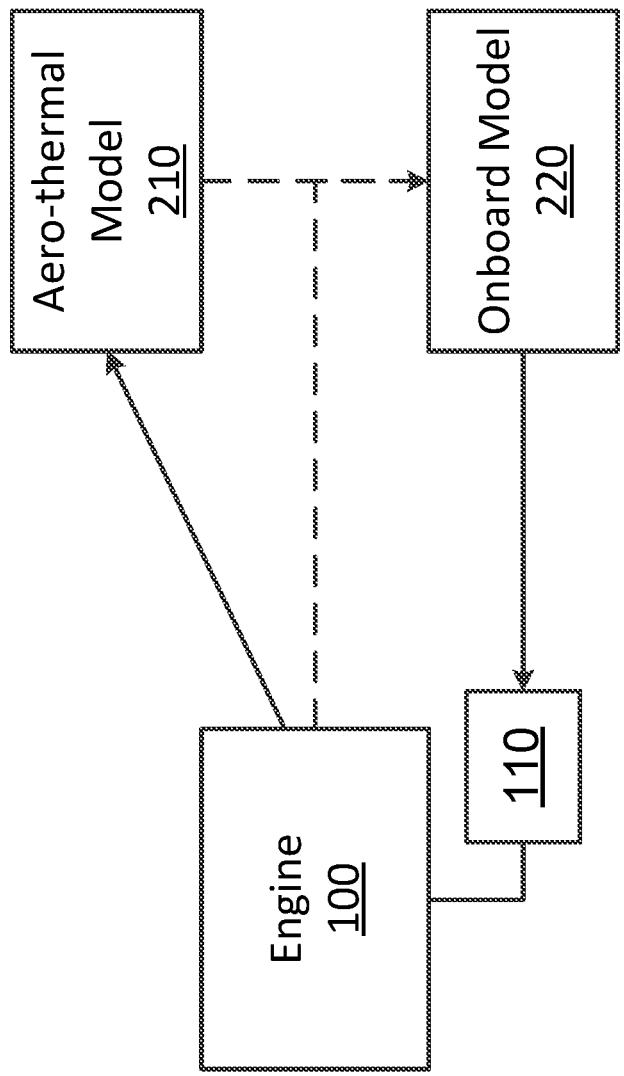
FIG. 2 is a block diagram of example engine models for the gas turbine engine of FIG. 1.

With additional reference to FIG. 2, the behaviour of parts or all of the engine 100 may be simulated using one or more models, which are typically generated by a manufacturer or designer of the engine 100. The models may be provided with various engine parameters and/or operating conditions obtained by sensors associated with the engine 100, and simulate the response of the engine 100 to the engine parameters and/or operating conditions. Depending on the purpose and use case, models having different levels of complexity and accuracy can be designed. Models having higher complexity may require additional computing resources to be properly implemented, including additional storage space and processing power. Conversely, models having lower complexity may require reduced computing resources, and can be implemented on simpler computing systems. In the embodiment illustrated in FIG. 2, two models are developed: an aero-thermal model 210, and an onboard model 220.

The aero-thermal model 210 of the engine 100 is devised based on the engine 100. The aero-thermal model 210 provides a highly-accurate simulation environment for the engine 100. The aero-thermal model 210 would typically be employed by designers or manufacturers of the engine 100, or of systems which use the engine 100, to determine how the engine will behave in various scenarios. For instance, the aero-thermal model 210 of the engine 100 may be used to devise control systems for the engine 100, to design aircraft which will employ the engine 100, and the like.

The onboard model 220 is a simpler model than the aero-thermal model 210, and therefore provides less accurate results when employed. In some embodiments, the onboard model 220 is designed for use by the engine controller 110 to simulate the behaviour of the engine 100 during operation thereof. For example, the engine controller 110 can use the onboard model 220 to simulate certain engine parameters of the engine 100 which are not measured by sensors, or which cannot be synthesized in other fashions. The onboard model 220 may be developed based on the aero-thermal model 210, for instance by simplifying one or more aspects of the aero-thermal model 210. For instance, one or more linearization operations are applied to the aero-thermal model 210 to generate the onboard model 220, which may involve a state-perturbation process associated with particular inputs. Alternatively, the onboard model 220 may be developed separately based on the operation of the engine 100.

As the onboard model 220 is less accurate than the aero-thermal model 210, the engine parameters simulated by the engine controller 110 using the onboard model 220 may differ from those which would be produced by the aero-thermal model using similar inputs. It may nevertheless be desirable to synthesize engine parameters having a higher degree of accuracy using the onboard model 220. To this end, the present disclosure provides methods and systems for determining a synthesized engine parameter for the engine 100 which may, in certain non-limiting embodiments, provide increased accuracy and/or precision for the synthesized engine parameter. The methods and systems provided herein may make use of model parameters provided by the onboard model 220 and perform one or more correction steps in order to improve the accuracy of the model parameters.

Figure 3:
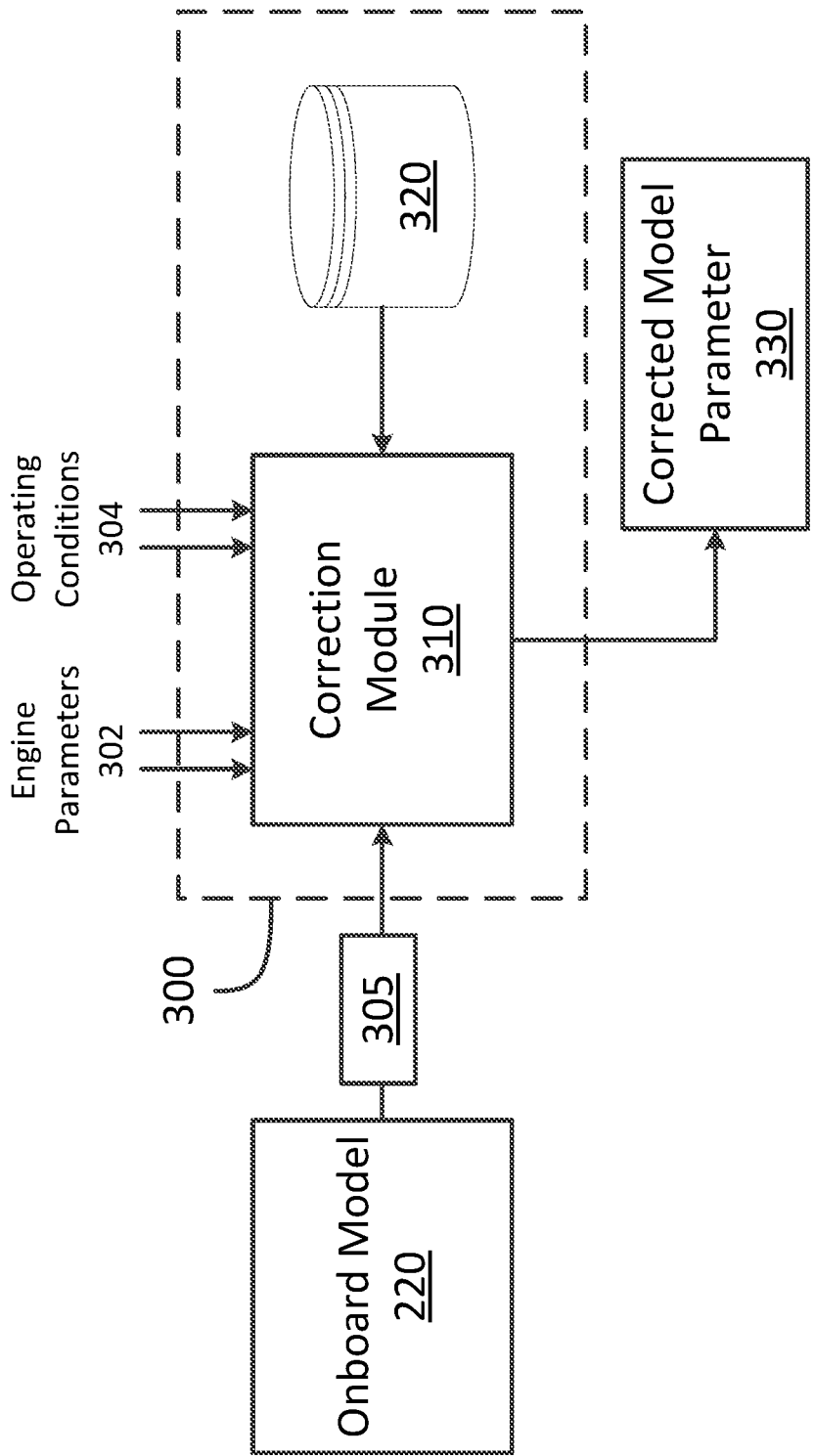
FIG. 3 is a block diagram of an example system for determining a synthesized engine parameter for the gas turbine engine of FIG. 1.

With reference to FIG. 3, there is illustrated a system 300 for determining a synthesized engine parameter, illustrated here as corrected model parameter 330. The system is composed of a correction module 310 and a database 320 which is communicatively coupled to the correction module 310. It should be noted that the system 300 may be implemented by the engine controller 110, which also operates the onboard model 220. The correction module 310 is configured for producing the corrected model parameter 330 based on an output from the onboard model 220, referred to herein as an initial model parameter 305. The initial model parameter 305 provided by the onboard model 220 can be any suitable type of engine parameter, such as an engine temperature, an engine pressure, or any other value synthesized by the onboard model 220. In some embodiments, the onboard model 220 is developed as a state variable model, and the initial model parameter 305 can be any value synthesized by the state variable model.

The correction module 310 is configured for determining a correction factor for the onboard model 220. The correction factor can be determined in a variety of fashions, as will be described hereinbelow. In some embodiments, the correction module determines the correction factor based on a difference between the onboard model 220 and the aero-thermal model 210. The difference between the onboard model 220 and the aero-thermal model 210 can be modified based on one or more engine parameters 302 of the engine 100, based on one or more operating conditions 304 of the engine 100 or of a system of which the engine 100 is a part, for instance an aircraft, or any suitable combination thereof. For example, the correction module 310 can be provided with values for known differences between the onboard model 220 and the aero-thermal model 210, each associated with predetermined engine parameters 302 and/or operating conditions 304. The known differences can be stored, for instance, in the database 320. The correction module 310 may select one or more known differences which are associated with values of the engine parameters 302 and/or operating conditions 304 near the actual values therefor, and modify the known difference(s) to align with the actual values.

The correction factor is used to correct the initial model parameter 305, thereby producing the corrected model parameter 330. The correction factor can be applied to the initial model parameter 305 in various ways. For example, the correction factor can include a multiplicative factor, which is used to scale the initial model parameter 305 to obtain the corrected model parameter 330. Alternatively, or in addition, the correction factor can include an additive factor, which is combined with the initial model parameter 305 to obtain the corrected model parameter 330. Other approaches are also considered.

Once the corrected model parameter 330 is determined, the correction module 310 outputs the corrected model parameter 330. The correction module 310 may output the corrected model parameter 330 to another portion of the engine controller 110, or to an outside component. For instance, in some embodiments in which the engine 100 forms part of an aircraft, the correction module 310 outputs the corrected model parameter 330 to an avionics system and/or aircraft controller associated with the aircraft. In this fashion, the corrected model parameter 330, which may be of a higher level of accuracy and/or precision than the initial model parameter 305, can be provided to other systems and/or devices for use thereby. As a result, the system 300 can be used to improve the accuracy and/or precision of the onboard model 220.

Figure 4:
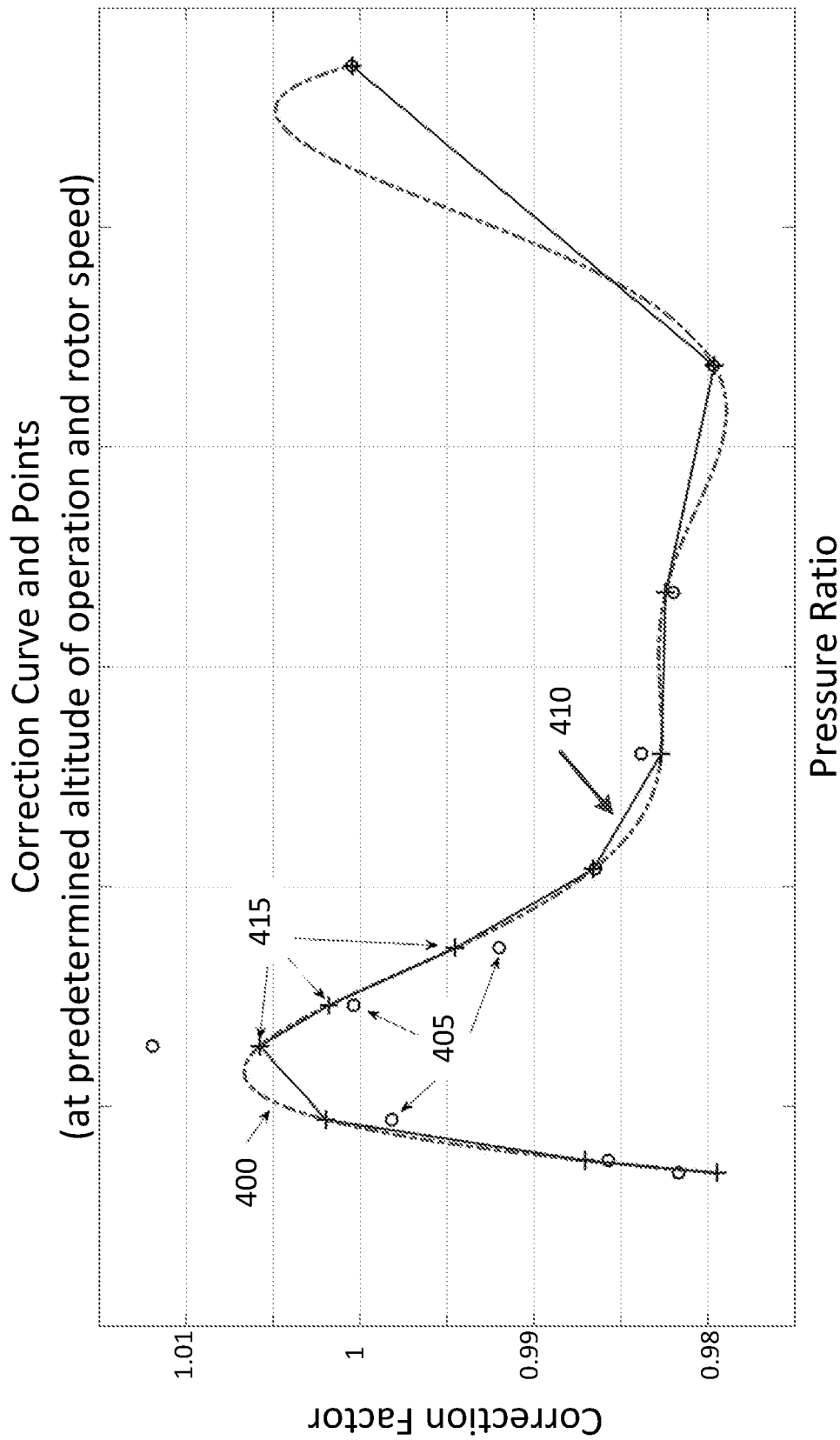
FIG. 4 is a graph illustrating an example correction curve associated with the system of FIG. 3.

With reference to FIG. 4, the difference between the onboard model 220 and the aero-thermal model 210, as stored in the database 320 and used by the correction module 310, may be provided in a variety of forms. FIG. 4 illustrates two example differences: a correction curve 400, and a linearized correction function 410. The correction curve 400 is based on a collection of raw correction points 405, and is provided for a predetermined altitude of operation of the engine 100, and a predetermined rotor speed. For instance, the correction curve 400 may be a best-fit curve for the raw correction points 405. The raw correction points 405 can be developed by a manufacturer or designer of the engine 100, and is based on the difference between the onboard model 220 and the aero-thermal model 210.

The linearized correction function 410 may represent a simplification of the correction curve 400 via one or more linearization processes. For instance, one or more splines are established to approximate the correction curve 400. One or more best-fit techniques may be performed to optimize the splines, thereby producing the linearized correction function 410. In some cases, the linearized correction function 410 may be defined by a collection of correction points, indicated by crosses at 415, such that interpolating lines between the correction points 415 produces the linearized correction function 410. The correction curve 400 and the linearized correction function 410 detail the correction factor to be applied to the initial model parameter 305 as a function of a pressure ratio for the engine 100.

In some embodiments, the database 320 can be provided with the correction curve 400 for use by the correction module 310. One or more additional correction curves 400 associated with different altitudes of operation, different rotor speeds, and/or with other different engine parameters 302 and/or operating conditions 304 can also be stored in the database 320. However, in some other embodiments, the database 320 may not be configured for storing the correction curve 400, or the correction module 310 may not be provided with the processing capabilities for using the correction curve 400.

In some such embodiments, the correction curve 400 is not provided as part of the system 300, and instead the correction points 415 are provided. The correction points 415 are used to produce the linearized correction function 410, which represents a simplified version of the correction curve 400: the inclusion of discrete points, rather than a curve or function, may result in storage space savings. Additionally, the use of the linearized correction function 410 based on the correction points 415 may also simplify calculations performed by the correction module 310. The database 320 can be provided with multiple collections of correction points 415, each associated with different altitudes of operation, different rotor speeds, and/or with other different engine parameters 302 and/or operating conditions 304. In some other embodiments, one or more linearized correction function 410 may be stored in the database 320 and provided for use by the correction module 310.

In one example implementation, multiple raw correction factors are obtained, based on evaluated differences between the onboard model 220 and the aero-thermal model 210, across an operating space of the engine 100. For example, differences between the onboard model 220 and the aero-thermal model 210 are evaluated at various altitudes of operation, temperatures, pressures, rotor speeds, and the like. In the case where the engine 100 is part of an aircraft, the evaluation of the difference between the onboard model 220 and the aero-thermal model 210 can also be performed across different airspeeds. In some embodiments, the evaluation of the difference between the onboard model 220 and the aero-thermal model 210 at a predetermined set of engine parameters 302 and operating conditions 304, and the associated raw correction factor, are determined based on the equation set:

$$E = S - A$$
$$C = 1 - \frac{E}{S}$$

where A is an estimated parameter based on the aero-thermal model 210, S is the estimated parameter based on the onboard model 220, E is the error between the estimated parameters of both models 210, 220, and C is the raw correction factor.

The raw correction factors are then grouped based on certain common characteristics. For example, all the raw correction factors at a common temperature, or for a common set of temperatures, are grouped. By way of another example, all the raw correction factors at a common altitude, or for a common set of altitudes, are grouped. Similar approaches are considered for rotor speeds, or other engine parameters and/or operating conditions. Within each group of correction factors, a non-linear function is used to fit the raw correction factors, for instance using a least-squares regression method, or any other suitable regression technique. The raw correction factors may be associated with certain schedules for the engine 100. The non-linear functions are then discretized using piecewise linear functions to approximate the non-linear functions. The piecewise linear functions are then defined using discrete coordinates, allowing them to be reconstructed using interpolation when needed by the correction module 310.

In some embodiments of the aforementioned example implementation, the grouping of the raw correction factors is performed based on three temperature categories: a first category associated with a first temperature dictated by the International Standard Atmosphere (ISA) for a given set of atmospheric parameters, a second category associated with a predetermined "extreme hot" temperature above the first temperature, and a third category associated with a predetermined "extreme cold" temperature below the first temperature. It should be understood that other example implementations using more, or fewer, temperature categories are also considered. The grouping of the raw correction factors into these three groups can be used to generate various correction curves, point collections, tables, or the like, for various other parameters, including an altitude of operation of the aircraft.

In some embodiments of the aforementioned example implementation, one or more engine parameters 302 and/or operating conditions 304 are selected as main interpolation parameters for the difference between the onboard model 220 and the aero-thermal model 210. For instance, a particular pressure ratio of an inlet total pressure of the engine 100 to an inlet total pressure basepoint, referred to herein as the inlet pressure ratio $P_{2RATIO}$, can be used as a main interpolation parameter. In the case of the inlet pressure ratio $P_{2RATIO}$, the inlet total pressure basepoint is a function of the inlet pressure of the engine 100 and the ambient pressure in the vicinity of the engine 100, such that $$P_{2RATIO} = \frac{P_2}{P_{2BASE}}$$

$$P_{2BASE} \propto \frac{P_2}{P_{AMB}}$$

where $P_2$ is the inlet total pressure of the engine 100, $P_{2BASE}$ is the inlet total pressure basepoint, and $P_{AMB}$ is the ambient pressure in the vicinity of the engine 100. It should be noted that the inlet total pressure $P_2$ is a function of both the ambient pressure $P_{AMB}$ and the airspeed of the aircraft of which the engine 100 is a part. Additionally, the inlet total pressure basepoint $P_{2BASE}$ is the value of the inlet total pressure $P_2$ interpolated between basepoints of the onboard model 220. The basepoints of the onboard model 220 are defined as points within the operating envelope of the engine 100 where outputs of the onboard model 220 correspond to those of the aero-thermal model 210. For example, a one-dimensional lookup table can be used to interpolate values for the inlet total pressure basepoint $P_{2BASE}$ between values of the inlet total pressure $P_2$ and the basepoints for the onboard model 220.

In some cases, multiple main interpolation parameters can be used concurrently. For instance, the inlet pressure ratio $P_{2RATIO}$ is a first main interpolation parameter, and a second interpolation parameter is a rotor speed of the engine 100. The rotor speed may be the speed of the high-pressure shaft 124 (sometimes referred to as $N_2$), the speed of the low-pressure shaft 128 (sometimes referred to as $N_1$), or another rotor speed associated with the engine 100. When multiple main interpolation parameters are used, the selection of which engine parameters 302 and/or operating conditions 304 to use may be performed on the basis of the independence of the selected parameters. For instance, the inlet pressure ratio $P_{2RATIO}$ and the low-pressure shaft rotor speed $N_1$ are independent of one another over a operating envelope of the engine 100. That is to say, changes in the inlet pressure ratio $P_{2RATIO}$ do not result in changes in the low-pressure shaft rotor speed $N_1$, and vice-versa. In one example implementation, the inlet pressure ratio $P_{2RATIO}$ is used to schedule the correction factors for different altitude groups across the operating envelope of the engine 100, for average values of the low-pressure shaft rotor speed $N_1$, and for the aforementioned temperature categories.

For example, the raw correction factors are grouped based on altitude of operation, low-pressure shaft rotor speed $N_1$, and temperature category. Best-fit non-linear curves as a function of the inlet pressure ratio $P_{2RATIO}$ are generated based on the raw correction factors, which may correspond to the correction curve 400 of FIG. 4. As discussed hereinabove, the curves can be discretized to piecewise linear approximations. In some cases, the piecewise linear approximations are represented in a table format as coordinates which, when interpolated, reproduce the piecewise linear approximations. The different piecewise linear approximations are each represented using a common number of coordinates in order to simplify their application.

Figure 5:
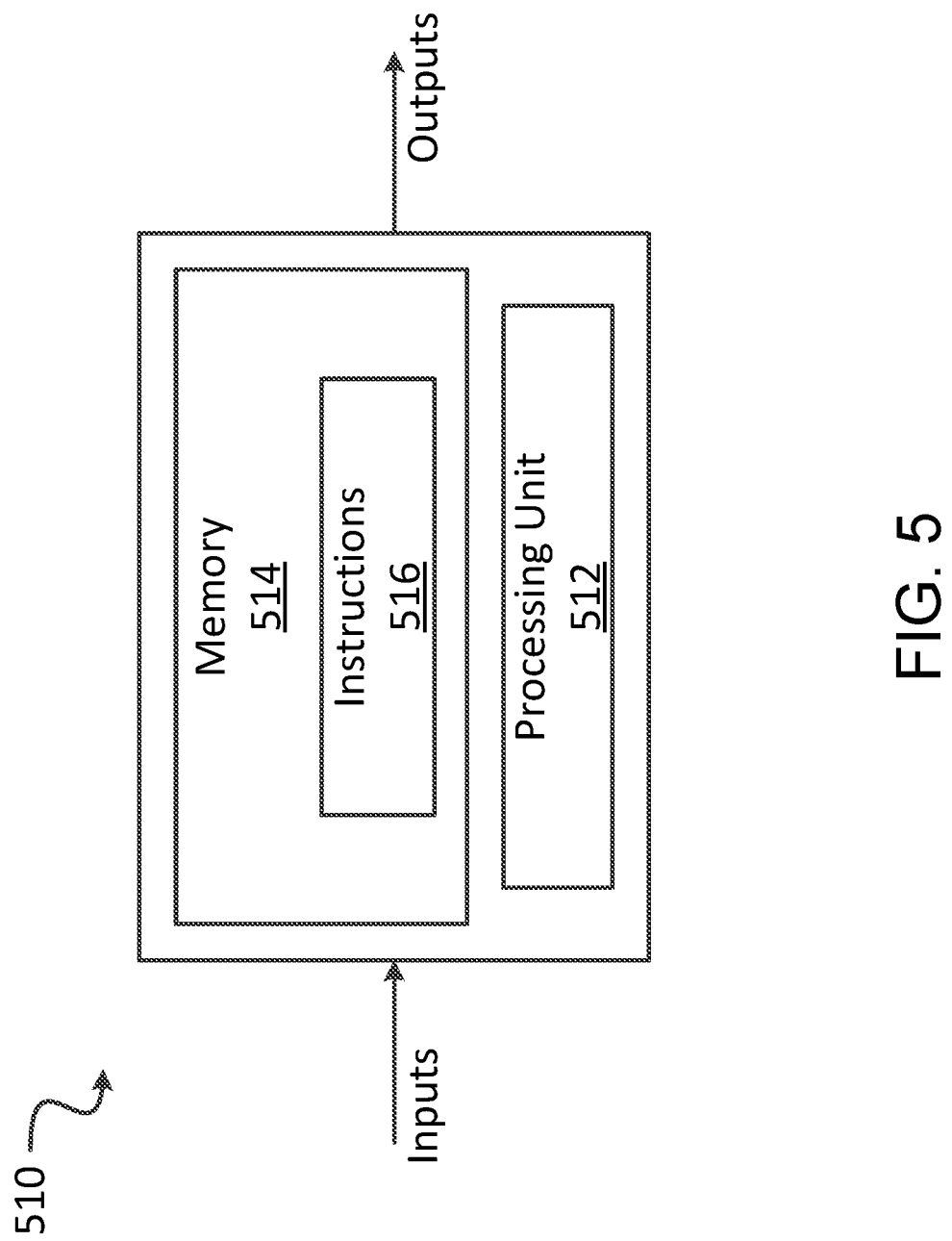
FIG. 5 is a block diagram of an example computing device for implementing part or all of the system of FIG. 3.

With reference to FIG. 5, there is illustrated an embodiment of a computing device 510 for implementing part or all of the system 300 described above. The computing device 510 can be used to perform part or all of the functions of the engine controller 110 of the engine 100. In some embodiments, the engine controller 110 is composed only of the computing device 510. In some embodiments, the computing device 510 is within the engine controller 110 and cooperates with other hardware and/or software components within the engine controller 110. In both of these cases, the engine controller 110 implements the functionality of the system 300. In some other embodiments, the computing device 510 is external to the engine controller 110 and interacts with the engine controller 110. In some other embodiments, some hardware and/or software components are shared between the engine controller 110 and the computing device 510, without the computing device 510 being integral to the engine controller 110. In both of these cases, the functionality of the system 300 can be implemented by the engine controller 110, by the computing device 510, or by a combination of both.

The computing device 510 comprises a processing unit 512 and a memory 514 which has stored therein computer-executable instructions 516. The processing unit 512 may comprise any suitable devices configured to cause a series of steps to be performed such that instructions 516, when executed by the computing device 510 or other programmable apparatus, may cause the functions/acts/steps specified in the method 300 described herein to be executed. The processing unit 512 may comprise, for example, any type of general-purpose microprocessor or microcontroller, a digital signal processing (DSP) processor, a CPU, an integrated circuit, a field programmable gate array (FPGA), a reconfigurable processor, other suitably programmed or programmable logic circuits, or any combination thereof.

The memory 514 may comprise any suitable known or other machine-readable storage medium. The memory 514 may comprise non-transitory computer readable storage medium, for example, but not limited to, an electronic, magnetic, optical, electromagnetic, infrared, or semiconductor system, apparatus, or device, or any suitable combination of the foregoing. The memory 514 may include a suitable combination of any type of computer memory that is located either internally or externally to device, for example random-access memory (RAM), read-only memory (ROM), electro-optical memory, magneto-optical memory, erasable programmable read-only memory (EPROM), and electrically-erasable programmable read-only memory (EEPROM), Ferroelectric RAM (FRAM) or the like. Memory 514 may comprise any storage means (e.g., devices) suitable for retrievably storing machine-readable instructions 516 executable by processing unit 512.

It should be noted that the computing device 510 may be implemented as part of a FADEC or other similar device, including an electronic engine control (EEC), engine control unit (EUC), engine electronic control system (EECS), an Aircraft Avionics System, and the like. In addition, it should be noted that the techniques described herein can be performed by a computing device 510 substantially in real-time.

Figure 6A:
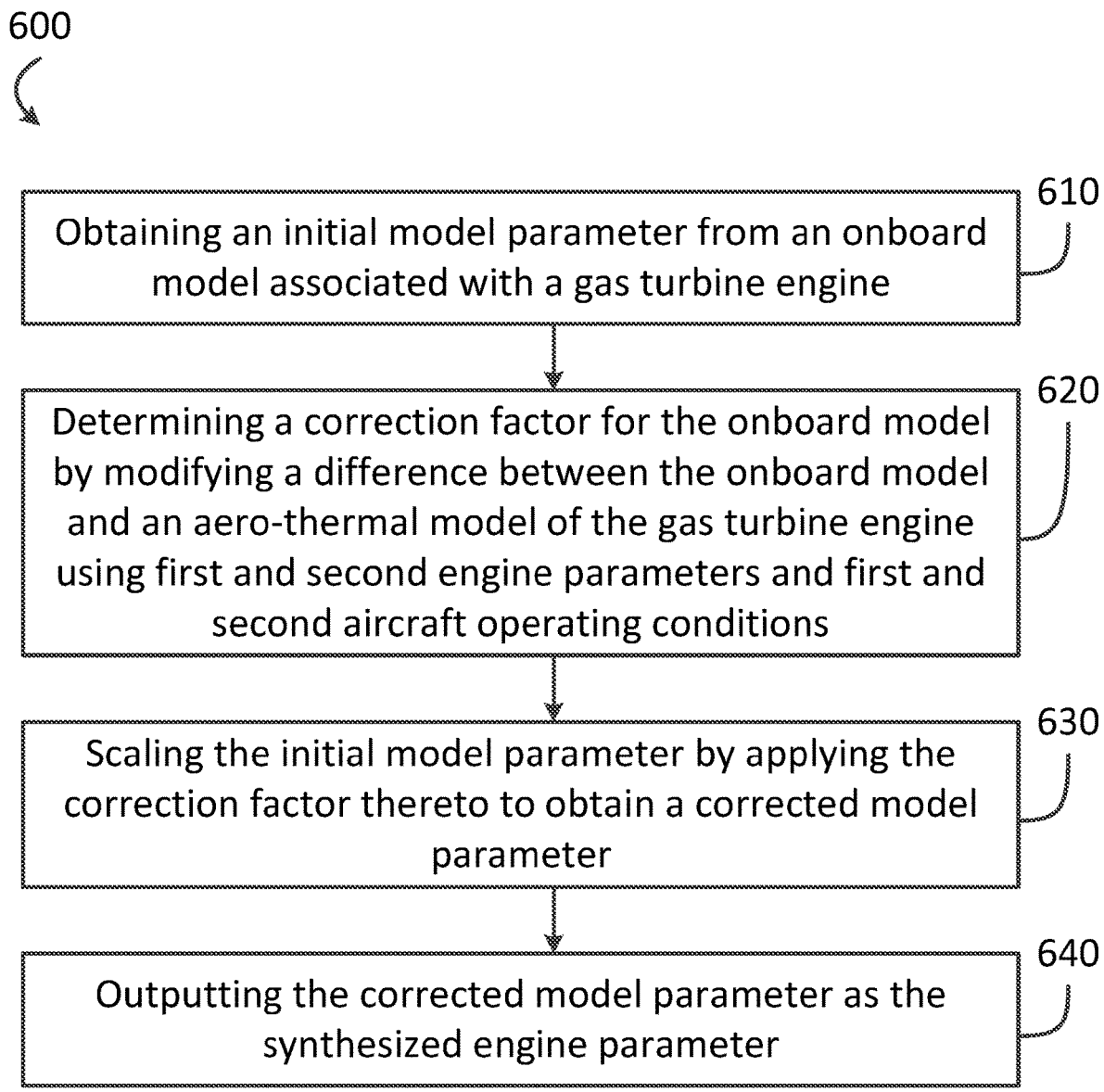
FIGS. 6A-B are flowcharts illustrating example methods for determining a synthesized engine parameter of the gas turbine engine of FIG. 1.

With reference to FIG. 6A, the computing device 510 and/or the engine controller 110 may be configured for performing a method 600 for determining a synthesized engine parameter of a gas turbine engine, for example the corrected model parameter 330 and the engine 100. The steps described in conjunction with the method 600 may also be implemented by the system 300.

At step 610, the method 600 comprises obtaining an initial model parameter from an onboard model associated with a gas turbine engine. For example, the initial model parameter 305 is obtained from the onboard model 220 of the engine 100. As noted hereinabove, the onboard model 220 may be implemented by the engine controller 110, which is associated with the engine 100.

At step 620, the method 600 comprises determining a correction factor for the onboard model 220 by modifying a difference between the onboard model 220 and an aerothermal model of the engine 100, for instance the aerothermal model 210. The difference may be modified using first and second engine parameters, which are independent from one another over an operating envelope of the engine 100, and using first and second operating conditions. In embodiments in which the engine 100 is part of an aircraft, the operating conditions include aircraft operating conditions. For example, the engine parameters include the inlet pressure ratio $P_{2RATIO}$ and the low-pressure shaft rotor speed $N_1$. In addition, the operating conditions include the ambient temperature in the vicinity of the engine 100, and the altitude of operation of the engine 100.

At step 630, the method 600 comprises scaling the initial model parameter 305 by applying the correction factor, determined as part of step 620, to the initial model parameter 305 to obtain the corrected model parameter 330.

At step 640, the method 600 comprises outputting the corrected model parameter 330 as the synthesized engine parameter. The corrected model parameter 330 may be output by the correction module 310 of FIG. 3 to the engine controller 110, or to one or more systems outside the engine controller 110. For instance, in embodiments in which the engine 100 forms part of an aircraft, the corrected model parameter 330 may be output to an avionics system associated with the aircraft, or to any other aircraft-level system, as appropriate.

It should be noted that the method 600 may be performed repeatedly for multiple different initial model parameters 305, and/or for multiple values of a common initial model parameter 305. For example, the initial model parameter 305 may be a pressure at a particular point within the engine 100, and the engine controller 110 may request that a corrected model parameter 330 for the pressure be produced at a predetermined interval, or at particular times, for instance in response to a request. In another example, an avionics system for an aircraft associated with the engine 100 may request corrected model parameters for an engine temperature and an engine pressure every few seconds. Other use cases are also considered.

Figure 6B:
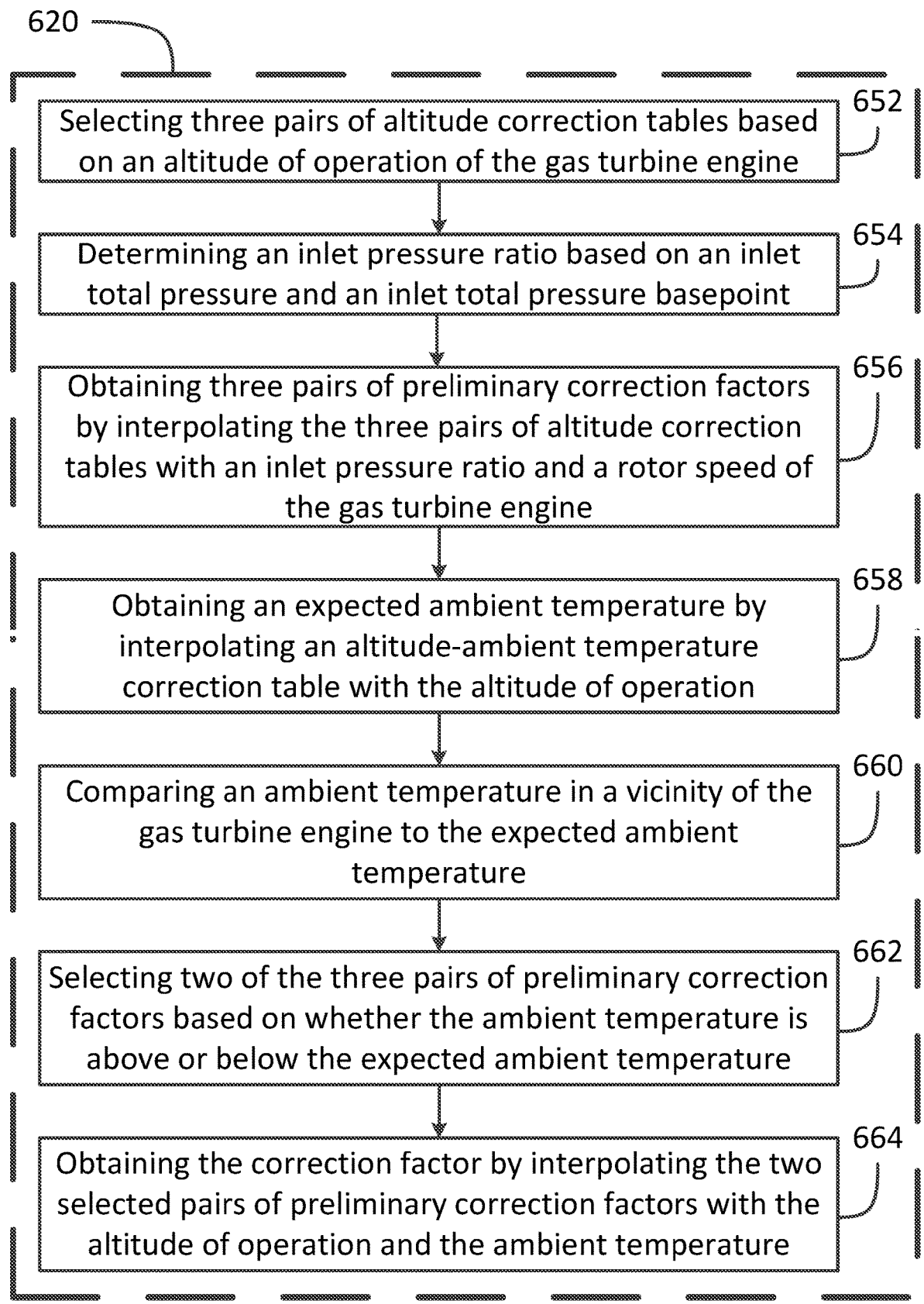

With reference to FIG. 6B, an example approach for determining the correction factor for the onboard model 220, performed as part of step 620 of the method 600, is illustrated. It should be noted that other approaches for determining the correction factor, as well as variations to the approach described hereinbelow, are also considered.

At step 652, the step 620 comprises selecting three pairs of altitude correction tables based on an altitude of operation of the engine 100. The selection of the altitude correction tables in each pair is performed by selecting a first altitude correction table which is above the altitude of operation of the engine 100, and by selecting a second altitude correction table which is below the altitude of operation. The spacing between the first and second altitude correction tables may vary based on the altitude of operation, and the number of possible altitude correction tables available to the correction module 310. The altitude correction tables may be developed by a manufacturer or designer of the engine 100, and store coordinates much like the correction points 415 described in conjunction with FIG. 4. The altitude correction tables are each associated with a respective temperature category: a first altitude correction table is associated with the ISA temperature, a second is associated with a predetermined "extreme hot" temperature above the ISA temperature, and a third is associated with a predetermined "extreme cold" temperature below the ISA temperature.

At step 654, the step 620 comprises determining an inlet pressure ratio based on an inlet total pressure and an inlet total pressure basepoint, for instance the inlet pressure ratio $P_{2RATIO}$ described hereinabove. The inlet pressure ratio $P_{2RATIO}$ may be determined based on measured values for the inlet total pressure $P_2$, the ambient pressure $P_{AMB}$, and the airspeed of the aircraft of which the engine 100 is a part. Other approaches are also considered.

At step 656, the step 620 comprises obtaining three pairs of preliminary correction factors by interpolating the three pairs of altitude correction tables with the inlet pressure ratio $P_{2RATIO}$ and a rotor speed of the engine 100, for instance the low-pressure shaft rotor speed $N_1$. The interpolation of the three pairs of altitude correction tables consists in mapping the inlet pressure ratio $P_{2RATIO}$ and the low-pressure shaft rotor speed $N_1$ to the three pairs of altitude correction tables to determine the three pairs of preliminary correction factors.

At step 658, the step 620 comprises obtaining an expected ambient temperature by interpolating an altitude-ambient temperature correction table with the altitude of operation of the engine 100. The altitude-ambient temperature correction table can be developed by a manufacturer or designer of the engine 100, and is used to map an actual altitude of operation of the engine 100 to an expected ambient temperature.

At step 660, the step 620 comprises comparing an ambient temperature in a vicinity of the engine 100 to the expected ambient temperature. At step 662, the step 620 comprises selecting two of the three pairs of preliminary correction factors based on whether the ambient temperature is above or below the expected ambient temperature. For example, when the ambient temperature is above the expected ambient temperature, the pair of preliminary correction factors associated with the ISA temperature and the pair of preliminary correction factors associated with the predetermined "extreme hot" temperature above the ISA temperature are selected. In another example, when the ambient temperature is below the expected ambient temperature, the pair of preliminary correction factors associated with the ISA temperature and the pair of preliminary correction factors associated with the predetermined "extreme cold" temperature below the ISA temperature are selected.

At step 664, the step 620 comprises obtaining the correction factor by interpolating the two selected pairs of preliminary correction factors with the altitude of operation and the ambient temperature. The interpolation of the two selected pairs of preliminary correction factors can be performed similarly to the interpolation of the three pairs of altitude correction tables, discussed hereinabove in relation to step 656, or in any other suitable fashion. For example, the altitude-based interpolation can be performed based on an altitude ratio based on two altitude gaps. The first altitude gap is set as the value between the altitude associated with the lower altitude correction table and the altitude of operation of the engine, and the second altitude gap is set as the value between the lower and higher altitude correction tables. Similarly, the temperature-based interpolation can be performed based on a temperature ratio based on two temperature gaps. The first temperature gap is set as the value between the lower reference temperature value (either the predetermined "extreme cold" temperature or the ISA temperature) to the ambient temperature, and the second temperature gap is set as the value between the two selected reference temperatures: either the predetermined "extreme cold" temperature to the ISA temperature, or the ISA temperature to the predetermined "extreme hot" temperature.

With additional reference to FIGS. 1 and 3, in one example application, the method 600 of FIG. 6A, and in some cases the example implementation of the step 620 illustrated in FIG. 6B, are used to determine a bleed port pressure at the bleed port 150, referred to as $P_{2.8}$. The bleed port pressure $P_{2.8}$ may be of interest to an avionics system or another aircraft-level system when the engine 100 is part of an aircraft.

In the example application for the bleed port pressure $P_{2.8}$, an initial bleed port pressure $P_{2.8INIT}$ is obtained from the onboard model 220, which embodies the initial model parameter 305. The correction module 310 uses the differences stored in the database 320 to determine a correction factor to be applied to the initial bleed port pressure $P_{2.8INIT}$ by modifying the difference using the engine parameters 302 and the operating conditions 304. For instance, the correction module 310 obtains the inlet pressure ratio $P_{2RATIO}$, the low-pressure shaft rotor speed $N_1$, the ambient temperature in the vicinity of the engine 100, and the altitude of operation of the engine 100, which are used to modify the differences obtained from the database 320.

Once the correction factor is determined by the correction module 310, the correction module scales the initial bleed port pressure $P_{2.8INIT}$ using the correction factor. The correction module 310 thereby produces a corrected bleed port pressure, which can be output by the correction module 310 as the actual bleed port pressure $P_{2.8}$, which embodies the corrected model parameter 330.

The methods and systems described herein may be implemented in a high level procedural or object oriented programming or scripting language, or a combination thereof, to communicate with or assist in the operation of a computer system, for example the computing device 510. Alternatively, the methods and systems described herein may be implemented in assembly or machine language. The language may be a compiled or interpreted language. Program code for implementing the methods and systems described herein may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems described herein may also be considered to be implemented by way of a non-transitory computer-readable storage medium having a computer program stored thereon. The computer program may comprise computer-readable instructions which cause a computer, or more specifically the processing unit 512 of the computing device 510, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, additional numbers of altitude correction tables may be selected for additional temperature categories. Yet further modifications could be implemented by a person of ordinary skill in the art in view of the present disclosure, which modifications would be within the scope of the present technology.

The invention claimed is:

1. A method for determining a synthesized engine parameter of a gas turbine engine of an aircraft, comprising:
    generating an initial model parameter by a computing device running an onboard model;
    providing the initial model parameter to a correction model implemented on the computing device;
    determining by the computing device, a correction factor for the onboard model by modifying a difference between the onboard model and an aero-thermal model of the gas turbine engine using first and second engine parameters and first and second operating conditions, wherein the first and second engine parameters are independent from one another over an operating envelope of the gas turbine engine, the determining of the correction factor for the onboard model including selecting three pairs of altitude correction tables based on an altitude of operation of the gas turbine engine, each pair of altitude correction tables among the three pairs of altitude correction tables associated with a respective temperature category, and obtaining three pairs of preliminary correction factors by interpolating the three pairs of altitude correction tables with an inlet pressure ratio and a rotor speed of the gas turbine engine;
    scaling the initial model parameter by the computing device, by applying the correction factor thereto to obtain a corrected model parameter; and
    outputting the corrected model parameter from the computing device as the synthesized engine parameter to another system comprising an avionics system and/or aircraft controller associated with the aircraft.

2. The method of claim 1, wherein determining the correction factor for the onboard model comprises:
    comparing an ambient temperature in a vicinity of the gas turbine engine to an expected ambient temperature based on the altitude of operation;
    selecting two of the three pairs of preliminary correction factors based on whether the ambient temperature is above or below the expected ambient temperature;
    obtaining the correction factor by interpolating the two selected pairs of the three pairs of preliminary compensation factors with the altitude of operation and the ambient temperature.

3. The method of claim 2, further comprising obtaining the expected ambient temperature by interpolating an altitude-ambient temperature correction table with the altitude of operation.

4. The method of claim 1, wherein selecting the three pairs of altitude correction tables based on the altitude of operation comprises, for each pair of altitude correction tables of the three pairs of altitude correction tables, identifying a first altitude correction table associated with an altitude value above the altitude of operation and identifying a second altitude correction table associated with an altitude value below the altitude of operation.

5. The method of claim 1, further comprising determining the inlet pressure ratio based on an inlet total pressure and an inlet total pressure basepoint, wherein the inlet total pressure basepoint is based on a measured inlet pressure and a measured ambient pressure.

6. The method of claim 1, further comprising generating the altitude correction tables based on the aero-thermal model of the gas turbine engine.

7. The method of claim 1, wherein obtaining the correction factor comprises:
   determining a first altitude gap between an altitude of operation of the gas turbine engine and a first altitude associated with a first temperature category of the onboard model;
   determining a second altitude gap between the first altitude and a second altitude associated with a second temperature category of the onboard model; and
   determining an altitude gap ratio between the first altitude gap and the second altitude gap.

8. The method of claim 1, wherein obtaining the correction factor comprises:
   determining a first temperature gap between an ambient temperature in a vicinity of the gas turbine engine and a first temperature associated with a first temperature category of the onboard model;
   determining a second temperature gap between the first temperature and a second temperature associated with a second temperature category of the onboard model; and
   determining a temperature gap ratio between the first temperature gap and the second temperature gap.

9. The method of claim 1, further comprising obtaining an initial modeling signal as an output of the onboard model, wherein the initial modeling signal is a bleed port pressure.

10. A system for determining a synthesized engine parameter of a gas turbine engine, comprising:
    a processing unit; and
    a non-transitory computer-readable medium having stored thereon computer-readable instructions executable by the processing unit for:
       obtaining an initial model parameter from an onboard model associated with the gas turbine engine;
       determining a correction factor for the onboard model by modifying a difference between the onboard model and an aero-thermal model of the gas turbine engine using first and second engine parameters and first and second operating conditions, wherein the first and second engine parameters are independent from one another over an operating envelope of the gas turbine engine, the determining of the correction factor for the onboard model including selecting three pairs of altitude correction tables based on an altitude of operation of the gas turbine engine, each pair of altitude correction tables among the three pairs of altitude correction tables associated with a respective temperature category, and obtaining three pairs of preliminary correction factors by interpolating the three pairs of altitude correction tables with an inlet pressure ratio and a rotor speed of the gas turbine engine;
       scaling the initial model parameter by applying the correction factor thereto to obtain a corrected model parameter; and
       outputting the corrected model parameter as the synthesized engine parameter.

11. The system of claim 10, wherein determining the correction factor for the onboard model comprises:
    comparing an ambient temperature in a vicinity of the gas turbine engine to an expected ambient temperature based on the altitude of operation;
    selecting two of the three pairs of preliminary correction factors based on whether the ambient temperature is above or below the expected ambient temperature;
    obtaining the correction factor by interpolating the two selected pairs of the three pairs of preliminary compensation factors with the altitude of operation and the ambient temperature.

12. The system of claim 11, wherein the computer-readable instructions are further executable for obtaining the expected ambient temperature by interpolating an altitude-ambient temperature correction table with the altitude of operation.

13. The system of claim 10, wherein selecting the three pairs of altitude correction tables based on the altitude of operation comprises, for each pair of altitude correction tables of the three pairs of altitude correction tables, identifying a first altitude correction table associated with an altitude value above the altitude of operation and identifying a second altitude correction table associated with an altitude value below the altitude of operation.

14. The system of claim 10, wherein the computer-readable instructions are further executable for determining the inlet pressure ratio based on an inlet total pressure and an inlet total pressure basepoint, wherein the inlet total pressure basepoint is based on a measured inlet pressure and a measured ambient pressure.

15. The system of claim 10, wherein the computer-readable instructions are further executable for generating the altitude correction tables based on the aero-thermal model of the gas turbine engine.

16. The system of claim 10, wherein obtaining the correction factor comprises:
    determining a first altitude gap between an altitude of operation of the gas turbine engine and a first altitude associated with a first temperature category of the onboard model;
    determining a second altitude gap between the first altitude and a second altitude associated with a second temperature category of the onboard model; and
    determining an altitude gap ratio between the first altitude gap and the second altitude gap.

17. The system of claim 10, wherein obtaining the correction factor comprises:
    determining a first temperature gap between an ambient temperature in a vicinity of the gas turbine engine and a first temperature associated with a first temperature category of the onboard model;
    determining a second temperature gap between the first temperature and a second temperature associated with a second temperature category of the onboard model; and
    determining a temperature gap ratio between the first temperature gap and the second temperature gap.

18. The system of claim 10, wherein the computer-readable instructions are further executable for obtaining an initial modeling signal as an output of the onboard model, wherein the initial modeling signal is a bleed port pressure.

* * * * *